(12) United States Patent
Nagai et al.

(10) Patent No.: US 10,865,134 B2
(45) Date of Patent: Dec. 15, 2020

(54) GLASS

(71) Applicants: AGC Inc., Chiyoda-ku (JP); TSUBOTA LABORATORY, INC., Minato-ku (JP)

(72) Inventors: Kensuke Nagai, Tokyo (JP); Tetsuya Nakashima, Tokyo (JP); Yutaka Kuroiwa, Tokyo (JP); Hiroyuki Hijiya, Tokyo (JP); Masamichi Tanida, Tokyo (JP); Akio Koike, Tokyo (JP); Manabu Nishizawa, Tokyo (JP); Kazuo Tsubota, Tokyo (JP); Toshihide Kurihara, Tokyo (JP); Hidemasa Torii, Tokyo (JP)

(73) Assignees: AGC Inc., Chiyoda-ku (JP); TSUBOTA LABORATORY, INC., Minato-ku (JP)

( * ) Notice: Subject to any disclaimer, the term of this patent is extended or adjusted under 35 U.S.C. 154(b) by 9 days.

(21) Appl. No.: 15/995,379

(22) Filed: Jun. 1, 2018

(65) Prior Publication Data

US 2018/0297888 A1 Oct. 18, 2018

Related U.S. Application Data

(63) Continuation of application No. PCT/JP2016/085853, filed on Dec. 2, 2016.

(30) Foreign Application Priority Data

Dec. 2, 2015 (JP) .................................. 2015-235799

(51) Int. Cl.
| | | |
|---|---|---|
| *C03C 3/087* | (2006.01) | |
| *C03C 3/095* | (2006.01) | |
| *C03C 4/08* | (2006.01) | |
| *C03C 3/083* | (2006.01) | |
| *C03C 3/085* | (2006.01) | |
| *C03C 3/091* | (2006.01) | |
| *G02B 5/20* | (2006.01) | |

(52) U.S. Cl.
CPC .............. *C03C 4/085* (2013.01); *C03C 3/083* (2013.01); *C03C 3/085* (2013.01); *C03C 3/087* (2013.01); *C03C 3/091* (2013.01); *C03C 3/095* (2013.01); *G02B 5/208* (2013.01); *C03C 2204/00* (2013.01)

(58) Field of Classification Search
CPC .......... C03C 3/087; C03C 3/095; C03C 4/085
See application file for complete search history.

(56) References Cited

U.S. PATENT DOCUMENTS

| | | | |
|---|---|---|---|
| 6,407,021 B1 | 6/2002 | Kitayama et al. | |
| 2002/0169064 A1 | 11/2002 | Nagashima | |
| 2003/0144126 A1 | 7/2003 | Kitayama et al. | |
| 2010/0108914 A1* | 5/2010 | Fechner .................. | C03C 3/091 250/492.1 |
| 2016/0229735 A1 | 8/2016 | Akada | |

FOREIGN PATENT DOCUMENTS

| | | | |
|---|---|---|---|
| CN | 1364148 | 8/2002 | |
| JP | 02-038339 | 2/1990 | |
| JP | 06-345483 | 12/1994 | |
| JP | 06345483 A * | 12/1994 | ............. C03C 4/085 |
| JP | 2001-048576 | 2/2001 | |
| WO | WO 2000/012441 | 3/2000 | |
| WO | WO 2001/068545 A1 | 9/2001 | |
| WO | WO 2015/088026 A1 | 6/2015 | |
| WO | WO 2016/171141 | 10/2016 | |

OTHER PUBLICATIONS

International Search Report dated Jan. 24, 2017 in PCT/JP2016/085853 filed Dec. 2, 2016 (with English Translation).
Written Opinion dated Jan. 24, 2017 in PCT/JP2016/085853 filed Dec. 2, 2016.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

A wavelength-selective transmissive glass has a light transmittance $T_{more\ than\ 315\ nm\ and\ 400\ nm\ or\ less}$ at a wavelength of more than 315 nm and 400 nm or less represented by the formula shown below of 1% or more in terms of a plate thickness of 6 mm and a light transmittance $T_{315\ nm\ or\ less}$ at a wavelength of 315 nm or less represented by the formula shown below of 60% or less in terms of a plate thickness of 6 mm. $A_k$ is a weighting factor at a wavelength k (nm) for calculating T (light transmittance) defined in ISO-9050: 2003, and $T_k$ is a transmittance at the wavelength k (nm) in terms of a plate thickness of 6 mm:

$$T_{more\ than\ 315\ nm\ and\ 400\ nm\ or\ less} = (\Sigma_{k=more\ than\ 315}^{400} A_k \times T_k)/(\Sigma_{k=more\ than\ 315}^{400} A_k)$$

$$T_{315\ nm\ or\ less} = (\Sigma_{k=300}^{315} A_k \times T_k)/(\Sigma_{k=300}^{315} A_k).$$

12 Claims, No Drawings

GLASS

TECHNICAL FIELD

The present invention relates to a glass. More particularly, the invention relates to a wavelength-selective transmissive glass transmitting light in a specific wavelength region and having low transmittance of light in a wavelength region other than the specific wavelength region.

BACKGROUND ART

In window glasses for vehicles such as automobiles and window glasses for building materials mounted on houses such buildings, a glass cutting 98% or more of a wide range of ultraviolet rays is known (Patent Document 1).

PRIOR ART DOCUMENTS

Patent Document

Patent Document 1: WO2015/088026

SUMMARY OF THE INVENTION

Problems that the Invention is to Solve

Myopia includes refractive myopia and axial myopia, and is axial myopia in many cases. In the axial myopia, myopia is getting bad with extension of an eye axial length, and the extension is irreversible. In recent years, it is known that when children do outdoor activities, that is, do activities under sunlight for a long time, this can be a factor of suppressing the progress of myopia.

On the other hand, it is known that eyes suffer various damages by receiving ultraviolet rays. Specifically, it is known that UVB (light having a wavelength of 280 to 315 nm) of outdoor and the like is liable to affect keratitis and cataracts.

On the other hand, a wavelength-selective transmissive glass that transmits light in a specific wavelength region and does not transmit light in a wavelength region other than the specific wavelength region is not present until now.

The present invention has been made in view of the above problems, and has an object to provide a wavelength-selective transmissive glass transmitting light in a specific wavelength region exhibiting the effect of suppressing the extension of an eye axial length and having low transmittance of light in a wavelength region other than the specific wavelength region.

Means for Solving the Problems

To achieve the above object, the present invention provides a wavelength-selective transmissive glass having a light transmittance $T_{more\ than\ 315\ nm\ and\ 400\ nm\ or\ less}$ at a wavelength of more than 315 nm and 400 nm or less in the formula shown below of 1% or more in terms of a plate thickness of 6 mm and light transmittance $T_{315\ nm\ or\ less}$ at a wavelength of 315 nm or less represented by the formula shown below of 60% or less in terms of a plate thickness of 6 mm.

$$T_{more\ than\ 315\ nm\ and\ 400\ nm\ or\ less} = (\Sigma_{k=more\ than\ 315}^{400} A_k \times T_k)/(\Sigma_{k=more\ than\ 315}^{400} A_k) \quad \text{[Math. 1]}$$

$$T_{315\ nm\ or\ less} = (\Sigma_{k=300}^{315} A_k \times T_k)/(\Sigma_{k=300}^{315} A_k) \quad \text{[Math. 2]}$$

In the above formulae, $A_k$ is a weighting factor at a wavelength k (nm) for calculating T (light transmittance) defined in ISO-9050:2003, and $T_k$ is a transmittance at the wavelength k (nm) in terms of a plate thickness of 6 mm.

In the wavelength-selective transmissive glass of the present invention, a light transmittance $T_{360\ to\ 400\ nm}$ at a wavelength of 360 to 400 nm represented by the formula shown below is preferably 1% or more in terms of a plate thickness of 6 mm.

$$T_{360-400\ nm} = (\Sigma_{k=360}^{400} A_k \times T_k)/(\Sigma_{k=360}^{400} A_k) \quad \text{[Math. 3]}$$

In the above formula, $A_k$ is a weighting factor at a wavelength k (nm) for calculating light transmittance T defined in ISO-9050:2003, and $T_k$ is a transmittance at the wavelength k (nm) in terms of a plate thickness of 6 mm.

In the wavelength-selective transmissive glass of the present invention, a light transmittance $T_{400\ to\ 760\ nm}$ at a wavelength of 400 to 760 nm represented by the formula shown below is preferably 1% or more in terms of a plate thickness of 6 mm.

$$T_{400-760\ nm} = (\Sigma_{k=400}^{760} A'_k \times T_k)/(\Sigma_{k=400}^{760} A'_k) \quad \text{[Math. 4]}$$

In the above formula, $A'_k$ is a weighting factor at a wavelength k (nm) for calculating visible light transmittance (light source D65) T_D65 defined in ISO-9050:2003, and $T_k$ is a transmittance at the wavelength k (nm) in terms of a plate thickness of 6 mm.

In the wavelength-selective transmissive glass of the present invention, a total iron content represented by $Fe_2O_3$ is preferably 0.001 to 10 mass % and a value of Fe-Redox is 5 to 80%.

The wavelength-selective transmissive glass of the present invention preferably contains at least one element selected from the group consisting of Au, Ag, Sn, rare earth elements (excluding La and Y), Ti, W, Mn, As, Sb and U of 0.1 mass ppm or more and 5 mass % or less in a total amount in terms of oxides.

The wavelength-selective transmissive glass of the present invention preferably contains at least one element selected from the group consisting of Ce, Sn and Ti of 0.1 mass ppm or more and 5 mass % or less in a total amount in terms of oxides.

The wavelength-selective transmissive glass of the present invention preferably contains at least one element selected from the group consisting of Au, Ag, Sn, rare earth elements (excluding La and Y), W, Mn, As, Sb and U of 0.1 mass ppm or more and 5 mass % or less in a total amount in terms of oxides.

The wavelength-selective transmissive glass of the present invention preferably contains a colloid of at least one metal element selected from the group consisting of Group 1 to Group 14 in order to cause surface plasmon absorption by metal colloid. The colloid to be contained for this purpose is preferably colloidal particles having particle diameter of 1 μm or less. The metal element is preferably at least one selected from the group consisting of Ag, Au and Cu.

In the wavelength-selective transmissive glass of the present invention, a dominant wavelength Dw measured using light source A (standard light source A defined in CIE) is preferably 380 to 700 nm in terms of a plate thickness of 6 mm.

In the wavelength-selective transmissive glass of the present invention, a dominant wavelength Dw measured using light source A is preferably 380 to 480 nm in terms of a plate thickness of 6 mm.

In the wavelength-selective transmissive glass of the present invention, a dominant wavelength Dw measured using light source A is preferably 460 to 510 nm in terms of a plate thickness of 6 mm.

In the wavelength-selective transmissive glass of the present invention, a dominant wavelength Dw measured using light source A is preferably 500 to 570 nm in terms of a plate thickness of 6 mm.

In the wavelength-selective transmissive glass of the present invention, a dominant wavelength Dw measured using light source A is preferably 580 to 700 nm in terms of a plate thickness of 6 mm.

The wavelength-selective transmissive glass of the present invention preferably contains, as represented by mass % based on oxides, $SiO_2$: 60 to 80%, $Al_2O_3$: 0 to 7%, MgO: 0 to 10%, CaO: 4 to 20%, $Na_2O$: 7 to 20%, and $K_2O$: 0 to 10%, as a glass matrix composition.

The wavelength-selective transmissive glass of the present invention preferably contains, as represented by mass % based on oxides, $SiO_2$: 45 to 80%, $Al_2O_3$: more than 7 and 30% or less, $B_2O_3$: 0 to 15%, MgO: 0 to 15%, CaO: 0 to 6%, $Na_2O$: 7 to 20%, $K_2O$: 0 to 10%, and $ZrO_2$: 0 to 10%, as a glass matrix composition.

The wavelength-selective transmissive glass of the present invention preferably contains, as represented by mass % based on oxides, $SiO_2$: 45 to 70%, $Al_2O_3$: 10 to 30%, $B_2O_3$: 0 to 15%, at least one selected from the group consisting of MgO, CaO, SrO and BaO: 5 to 30%, and at least one selected from the group consisting of $Li_2O$, $Na_2O$ and $K_2O$: 0% or more and 7% or less, as a glass matrix composition.

Advantageous Effects of the Invention

The wavelength-selective transmissive glass of the present invention can selectively transmit light having a wavelength of more than 315 nm and 400 nm or less. When eyes receive the light transmitted the glass, the effect of suppressing extension of an eye axial length, that is, the effect of preventing axial myopia, is expected. On the other hand, transmittance of light in a wavelength region other than the above wavelength region, specifically light at a wavelength of 315 nm or less, can be suppressed low. Therefore, various damages of eyes by light of the wavelength region can be suppressed.

Due to the above effects, the wavelength-selective transmissive glass of the present invention is suitable for use in a window glass for building materials, a window glass for automobiles, a front plate of flat panel displays (FPD) such as liquid crystal display (LCD), plasma display (PDP), organic EL display (OLED) and field emission display (FED), a cover glass mounted on the front surface of those flat panel displays (FPD), a cover glass for chemical strengthening, an optical filter glass, virtual reality goggles or spectacles for three-dimensional images, virtual space images and the like, and a glass sheet thereof.

MODE FOR CARRYING OUT THE INVENTION

The glass of the present invention is a wavelength-selective transmissive glass transmitting light in a specific wavelength region and having low transmittance of light in a wavelength region other than the specific wavelength region. The specific wavelength region in the present invention is a wavelength of more than 315 nm and 400 nm or less. The reason that the light in the wavelength region is required to transmit is that when eyes receive light transmitted the glass, the effect of suppressing extension of an eye axial length, that is, the effect of preventing axial myopia, is expected as described above. On the other hand, light transmittance at a wavelength of 315 nm or less is low. Therefore, various damages of eyes by light in the wavelength region can be suppressed.

The wavelength-selective transmissive glass of the present invention has a light transmittance $T_{more\ than\ 315\ nm\ and\ 400\ nm\ or\ less}$ at a wavelength of more than 315 nm and 400 nm or less in the formula shown below of 1% or more in terms of a plate thickness of 6 mm.

$$T_{more\ than\ 315\ nm\ and\ 400\ nm\ or\ less} = (\Sigma_{k=more\ than\ 315}^{400} A_k \times T_k)/(\Sigma_{k=more\ than\ 315}^{400} A_k) \quad [\text{Math. 5}]$$

In the above formula, $A_k$ is a weighting factor at a wavelength k (nm) for calculating T (light transmittance) defined in ISO-9050:2003, and $T_k$ is a transmittance at the wavelength k (nm) in terms of a plate thickness of 6 mm.

Therefore, in the above formula, only the weighting factor in a wavelength region of more than 315 nm and 400 nm or less of the weighting factors for calculating T (light transmittance) defined in ISO-9050:2003 is used, the above formula is a value obtained by dividing the sum of product of the weighting factor ($A_k$) and the transmittance ($T_k$) in terms of a plate thickness of 6 mm in the wavelength range by the sum of weighting factors in the wavelength range and is an average value of transmittance ($T_k$) in terms of a plate thickness of 6 mm after weighting. The reason of using the transmittance in terms of a plate thickness of 6 mm is that the thickness is a general plate thickness of a window glass for building materials that is one of major uses of the wavelength-selective transmissive glass of the present invention.

For $A_k$ in ISO-9050:2003, the wavelength k is defined every 5 nm. Therefore, $A_k$ in the case of k=more than 315 in sigma in the above formula is treated as $A_k$ in the case of k=320 nm in the present invention.

The wavelength-selective transmissive glass of the present invention has the light transmittance $T_{more\ than\ 315\ nm\ and\ 400\ nm\ or\ less}$ of 1% or more in terms of a plate thickness of 6 mm. Therefore, the effect of suppressing extension of an eye axial length, that is, the effect of preventing axial myopia, is expected.

In the wavelength-selective transmissive glass of the present invention, the light transmittance $T_{more\ than\ 315\ nm\ and\ 400\ nm\ or\ less}$ is preferably 3% or more, more preferably 5% or more, still more preferably 10% or more, still further preferably 20% or more, still further preferably 30% or more, still further preferably 40% or more, still further preferably 60% or more, and particularly preferably 80% or more, in terms of a plate thickness of 6 mm.

Considering the balance in optical properties of $T_{more\ than\ 315\ nm\ and\ 400\ nm\ or\ less}$, $T_{315\ nm\ or\ less}$, $T_{360\ to\ 400\ nm}$ and $T_{400\ to\ 760\ nm}$, the $T_{more\ than\ 315\ nm\ and\ 400\ nm\ or\ less}$ is preferably 18 to 70%, more preferably 30 to 69%, and still more preferably 50 to 68%, in terms of a plate thickness of 6 mm.

In the wavelength-selective transmissive glass of the present invention, the light transmittance $T_{315\ nm\ or\ less}$ at a wavelength of 315 nm or less represented by the formula shown below is 60% or less in terms of a plate thickness of 6 mm.

$$T_{315\ nm\ or\ less} = (\Sigma_{k=300}^{315} A_k \times T_k)/(\Sigma_{k=300}^{315} A_k) \quad [\text{Math. 6}]$$

In the above formula, $A_k$ and $T_k$ are the same as defined above. Therefore, in the above formula, only the weighting factor in a wavelength range of 300 to 315 nm of the weighting factors for calculating T (light transmittance) defined in ISO-9050:2003 is used, the above formula is a value obtained by dividing the sum of product of the weighting factor ($A_k$) and transmittance ($T_k$) in terms of a plate thickness of 6 mm in the wavelength range by the sum of weighting factors in the wavelength range, and is an average value of transmittance ($T_k$) in terms of a plate thickness of 6 mm after weighting. The reason of using only the weighting factor in a wavelength range of 300 to 315 nm is that the value of the weighting factor ($A_k$) defined in ISO-9050:2003 is set to 0 when the wavelength is less than 300 nm.

When the light transmittance $T_{315\ nm\ or\ less}$ is 60% or less in terms of a plate thickness of 6 mm, the wavelength-selective transmissive glass of the present invention can suppress various damages of eyes by light in the wavelength region.

In the glass of the present invention, the light transmittance $T_{315\ nm\ or\ less}$ is preferably 45% or less, more preferably 30% or less, still more preferably 15% or less, still further preferably 5% or less, still further preferably 1% or less, and particularly preferably 0.8% or less in terms of a plate thickness of 6 mm. Furthermore, the light transmittance is preferably 0.5% or less, more preferably 0.3% or less, still more preferably 0.1% or less, and most preferably 0%.

In the wavelength-selective transmissive glass of the present invention, the light transmittance $T_{360\ to\ 400\ nm}$ at a wavelength of 360 to 400 nm represented by the formula shown below is preferably 1% or more in terms of a plate thickness of 6 mm.

$$T_{360\text{-}400\ nm} = (\Sigma_{k=360}^{400} A_k \times T_k)/(\Sigma_{k=360}^{400} A_k) \qquad \text{[Math. 7]}$$

In the above formula, $A_k$ and $T_k$ are the same as defined above. Therefore, in the above formula, only the weighting factor in a wavelength range of 360 to 400 nm of the weighting factors for calculating T (light transmittance) defined in ISO-9050:2003 is used, the above formula is a value obtained by dividing the sum of product of the weighting factor ($A_k$) and transmittance ($T_k$) in terms of a plate thickness of 6 mm in the wavelength range by the sum of weighting factors in the wavelength range and is an average value of transmittance ($T_k$) in terms of a plate thickness of 6 mm after weighting.

When the wavelength-selective transmissive glass of the present invention has the light transmittance $T_{360\ to\ 400\ nm}$ of 1% or more in terms of a plate thickness of 6 mm, the effect of suppressing extension of an eye axial length, that is, the effect of preventing axial myopia, is expected. The light having a wavelength region of 360 to 400 nm in the wavelength region of more than 315 nm and 400 nm or less particularly expects the effect of suppressing extension of an eye axial length, that is, the effect of preventing axial myopia.

In the wavelength-selective transmissive glass of the present invention, the light transmittance $T_{360\ to\ 400\ nm}$ is preferably 5% or more, more preferably 10% or more, still more preferably 20% or more, still further preferably 30% or more, still further preferably 40% or more, still further preferably 60% or more, and particularly preferably 80% or more, in terms of a plate thickness of 6 mm. Considering suppression of excessive incidence, the light transmittance is preferably 92% or less.

Considering the balance in optical properties of $T_{more\ than\ 315\ nm\ and\ 400\ nm\ or\ less}$, $T_{315\ nm\ or\ less}$, $T_{360\ to\ 400\ nm}$ and $T_{400\ to\ 760\ nm}$, the $T_{360\ to\ 400\ nm}$ is preferably 19 to 92%, more preferably 50 to 91%, and still more preferably 70 to 90%, in terms of a plate thickness of 6 mm.

In the wavelength-selective transmissive glass of the present invention, transmittance of visible light and infrared rays is not particularly limited, and is appropriately selected depending on uses.

Focusing on transmittance of visible light transmittance, in the wavelength-selective transmissive glass of the present invention, the visible light transmittance $T_{400\ to\ 760\ nm}$ at a wavelength of 400 to 760 nm represented by the formula shown below is preferably 1% or more in terms of a plate thickness of 6 mm.

$$T_{400\text{-}760\ nm} = (\Sigma_{k=400}^{760} A'_k \times T_k)/(\Sigma_{k=400}^{760} A'_k)$$

In the above formula, $T_k$ is the same as defined above. $A'_k$ is a weighting factor at a wavelength k (nm) for calculating visible light transmittance (light source D65) T_D65 defined in ISO-9050:2003. Therefore, in the above formula, only the weighting factor in a wavelength range of 400 to 780 nm of the weighting factors for calculating visible light transmittance (light source D65) T_D65 defined in ISO-9050:2003 is used, the above formula is a value obtained by dividing the sum of product of the weighting factor ($A_k$) and transmittance ($T_k$) in terms of a plate thickness of 6 mm in the wavelength range by the sum of weighting factors in the wavelength range, and is an average value of transmittance ($T_k$) in terms of a plate thickness of 6 mm after weighting.

When the wavelength-selective transmissive glass of the present invention has the visible light transmittance $T_{400\ to\ 760\ nm}$ of 1% or more in terms of a plate thickness of 6 mm, visibility of the back face of a glass is easy to obtain. As a result, luster and quality feeling inherent in a glass are easy to be recognized as compared with a resin, a metal and a wall material, and design is increased.

More preferred range of the visible light transmittance $T_{400\ to\ 760\ nm}$ varies depending on the uses of the wavelength-selective transmissive glass of the present invention. In the case of the uses requiring transmission of visible light, the visible light transmittance $T_{400\ to\ 760\ nm}$ is more preferably 10% or more, still more preferably 20% or more, still further preferably 40% or more, still further preferably 60% or more, still further preferably 80% or more, and particularly preferably 90% or more.

Considering the balance in optical properties of $T_{more\ than\ 315\ nm\ and\ 400\ nm\ or\ less}$, $T_{315\ nm\ or\ less}$, $T_{360\ to\ 400\ nm}$ and $T_{400\ to\ 760\ nm}$, the $T_{400\ to\ 760\ nm}$ is preferably 40 to 92%, more preferably 60 to 92%, and still more preferably 80 to 92%, in terms of a plate thickness of 6 mm.

Color tone of the wavelength-selective transmissive glass of the present invention can be appropriately selected depending on its use. In the present invention, a domain wavelength Dw measured using light source A is used as an index of color tone of the glass.

In the wavelength-selective transmissive glass of the present invention, the domain wavelength Dw measured using light source A is preferably 380 to 700 nm in terms of a plate thickness of 6 mm from the standpoint that glasses having various color tones depending on uses are included.

For example, a glass having the domain wavelength Dw of 380 to 480 nm is a purple glass, a glass having the domain wavelength Dw of 460 to 510 nm is a blue glass, a glass having the domain wavelength Dw of 500 to 570 nm is a green glass, and a glass having the domain wavelength Dw of 580 to 700 nm is a red glass.

An iron content in the glass, and a proportion of divalent iron ($Fe^{2+}$) and trivalent iron ($Fe^{3+}$) in the iron contained in the glass affect light transmittance of the wavelength-selective transmissive glass of the present invention. In other words, the iron content in the glass affects light transmittance of the overall light wavelength region of 300 to 400 nm.

On the other hand, the proportion of divalent iron ($Fe^{2+}$) and trivalent iron ($Fe^{3+}$) in the iron contained in the glass affects light transmittance in a wavelength region of 300 to 315 nm of light. In the present description, Fe-Redox is used as an index of the proportion of divalent iron ($Fe^{2+}$) and trivalent iron ($Fe^{3+}$) in the iron contained in the glass. The Fe-Redox is the proportion of $Fe^{2+}$ content in terms of $Fe_2O_3$ to the total iron content in terms of $Fe_2O_3$.

In the wavelength-selective transmissive glass of the present invention, a total iron content represented by $Fe_2O_3$ is 0.001 to 10 mass %, and a value of Fe-Redox is 5 to 80%.

When the total iron content represented by $Fe_2O_3$ is 0.001 mass % or more, meltability and defoaming property in a large-sized furnace are improved. The total iron content is preferably 0.01 mass % or more, more preferably 0.03 mass % or more, still more preferably 0.04 mass % or more, and most preferably 0.05 mass % or more.

On the other hand, when the total iron content represented by $Fe_2O_3$ is 10 mass % or less, the glass has the effect of making easy to transmit light in a near ultraviolet wavelength region. Furthermore, visibility of the back face of a glass is easy to obtain. As a result, luster and quality feeling inherent in a glass are easy to recognize as compared with a resin, a metal and a wall material, and design is improved. The total iron content is preferably 7 mass % or less, more preferably 5 mass % or less, and most preferably 2 mass % or less. Furthermore, the total iron content is preferably 0.5 mass % or less, more preferably 0.3 mass % or less, and still more preferably 0.15 mass % or less, as represented by mass % based on oxides.

When the Fe-Redox is 5% or more, defoaming property in a large-sized furnace is improved, and heat-shielding property of a glass is improved. The Fe-Redox is preferably 7% or more, more preferably 10% or more, still more preferably 15% or more, still further preferably 25% or more, still further preferably 30% or more, still further preferably 35% or more, and most preferably 40% or more.

On the other hand, when the Fe-Redox is 80% or less, light in a near ultraviolet wavelength region is easy to transmit, meltability of glass raw materials in manufacturing in a large-sized furnace is improved, and the amount of fuel used in melting can be reduced. The Fe-Redox is preferably 75% or less, more preferably 70% or less, still more preferably 65% or less, and most preferably 60% or less.

The wavelength-selective transmissive glass of the present invention preferably contains trance components having an action of absorbing light having a wavelength of 315 nm or less. Specific examples of the trance components having the action of absorbing light having a wavelength of 315 nm or less include Au, Ag, Sn, rare earth elements (excluding La and Y), Ti, W, Mn, As, Sb and U.

The wavelength-selective transmissive glass of the present invention preferably contains at least one element selected from the group consisting of Au, Ag, Sn, rare earth elements (excluding La and Y), Ti, W, Mn, As, Sb and U in the total amount of 0.1 mass ppm or more and 5 mass % or less in terms of oxides.

When the above components are contained in the total amount of 0.1 mass ppm or more, an action of absorbing light having a wavelength of 315 nm or less is exhibited. The components are contained in the total amount of more preferably 1 mass ppm or more, and still more preferably 5 mass ppm or more. On the other hand, when the above components are contained in the total amount of 5 mass % or less, stability of a glass represented by water resistance and chemical resistance is not deteriorated, cost of raw materials in a large-sized furnace is not increased, and color of a glass during manufacturing does not become difficult to control and stabilize. The above components are contained in the total amount of more preferably 2 mass % or less, and still more preferably 1 mass % or less.

Of the above components, Ce, Sn and Ti have high action of absorbing light having a wavelength of 315 nm or less, and are therefore preferred. The wavelength-selective transmissive glass of the present invention contains at least one element selected from the group consisting of Ce, Sn and Ti in a total amount of preferably 0.1 mass ppm or more, more preferably 1 mass ppm or more, and still more preferably 5 mass ppm, in terms of oxides. On the other hand, considering suppression of coloration and the like of the glass, the above components are contained in the total amount of preferably 5 mass % or less, more preferably 2 mass % or less, and still more preferably 1 mass % or less.

As represented by mass % based on oxides, it is preferred that $CeO_2$ is 0.1 to 0.8%, $TiO_2$ is 0 to 0.6%, and $SnO_2$ is 0 to 0.6%, it is more preferred that $CeO_2$ is 0.2 to 0.6%, $TiO_2$ is 0 to 0.4%, and $SnO_2$ is 0 to 0.4%, and it is still more preferred that $CeO_2$ is 0.35 to 0.45%, $TiO_2$ is 0 to 0.2%, and $SnO_2$ is 0 to 0.2%.

When $CeO_2/(CeO_2+TiO_2+Fe_2O_3)$ is 0.2 or more, preferably 0.3 or more, more preferably 0.4 or more, and still more preferably 0.5 or more, in the wavelength-selective transmissive glass of the present invention, the glass has the effect of absorbing light having a wavelength of 315 nm or less and maintaining the visible light transmittance $T_{400\ to\ 760\ nm}$ while maintaining the light transmittance $T_{360\ to\ 400\ nm}$ having high effect of suppressing extension of an eye axial length, and this is preferred. Furthermore, when the ratio is 0.95 or less, preferably 0.90 or less, more preferably 0.85 or less, still more preferably 0.8 or less, and still further preferably 0.75 or less, coloration is suppressed, and this is preferred.

For the effects of maintaining a predetermined light transmittance $T_{more\ than\ 315\ nm\ and\ 400\ nm\ or\ less}$, absorbing light having a wavelength of 315 nm or less while maintaining the light transmittance $T_{360\ to\ 400\ nm}$ having high effect of suppressing extension of an eye axial length, and maintaining visible light transmittance $T_{400\ to\ 760\ nm}$, and the effect of suppressing coloration, $CeO_2+3\times TiO_2+6\times SnO_2$ is preferably 0.1 to 2.0, more preferably 0.3 to 1.5, and still more preferably 0.41 to 1.2, is preferably 0.43 or more, and more preferably 0.45 or more, and is preferably 0.9 or less, more preferably 0.7 or less, still more preferably 0.55 or less, and still further preferably 0.5 or less.

Therefore, it is particularly preferred in the wavelength-selective transmissive glass of the present invention that as represented by mass % based on oxides, a total iron content represented by $Fe_2O_3$ is 0.04 to 0.15%, $CeO_2$ is 0.35 to 0.45%, $TiO_2$ is 0 to 0.2%, $SnO_2$ is 0 to 0.2%, $CeO_2+3\times TiO_2+6\times SnO_2$ is 0.41 to 0.5, and Fe-Redox is 25 to 65%.

Of the above components, Au, Ag, Sn, rare earth elements (excluding La and Y), W, Mn, As, Sb and U have an action of absorbing light having a wavelength of 315 nm or less and converting the light into visible light. The wavelength-selective transmissive glass of the present invention contains at least one element selected from the group consisting of Au, Ag, Sn, rare earth elements (excluding La and Y), W, Mn, As, Sb and U in the total amount as represented by mass % based on oxides of preferably 0.1 mass ppm or more, more preferably 1 mass ppm or more, and still more preferably 5 mass ppm or more. On the other hand, the glass contains the above components in the total amount of preferably 5 mass % or less, more preferably 2 mass % or less, and still more preferably 1 mass % or less.

The wavelength-selective transmissive glass of the present invention preferably contains a colloid of at least one metal element selected from the group consisting of Group 1 to Group 14 in order to cause surface plasmon absorption by metal colloid. The colloid to be contained for this purpose is preferably colloidal particles having a particle diameter of preferably 1 μm or less, more preferably 800 nm or less, still more preferably 600 nm or less, still further preferably 400 nm or less, and particularly preferably 300 nm or less. The metal element is preferably at least one selected from the group consisting of Ag, Au and Cu.

The wavelength-selective transmissive glass of the present invention may contain $SO_3$, Cl and F in a total amount of 1% of less, and preferably 0.5% or less, as refining agent. The wavelength-selective transmissive glass of the present invention may contain Se, Co, Ti, Cr, V, other transition metal elements, and the like in a total amount of 1% or less, and preferably 0.5% or less, as a coloring agent.

In the wavelength-selective transmissive glass of the present invention, an amount of water in the glass is preferably 90 to 800 mass ppm. When the amount of water is 90 mass ppm or more, a glass-forming region temperature is decreased, and bending becomes easy. Furthermore, infrared absorption intensity is increased, and heat-shielding performance is improved. On the other hand, when the amount of water is 800 ppm or less, stability of a glass represented by water resistance and chemical resistance is not deteriorated, and additionally, resistance to cracks and flaws is not deteriorated.

Glass matrix composition of the wavelength-selective transmissive glass of the present invention can be appropriately selected depending on its uses.

When the use of the wavelength-selective transmissive glass of the present invention is window glasses for building materials, window glasses for automobiles, glasses for optical filters, and the like, the glass preferably contains as a glass matrix composition $SiO_2$: 60 to 80%, $Al_2O_3$: 0 to 7%, MgO: 0 to 10%, CaO: 4 to 20%, $Na_2O$: 7 to 20% and $K_2O$: 0 to 10%, as represented by mass % based on oxides.

When $B_2O_3$ is contained, the content thereof is preferably 0.5% or less, and more preferably 0.2% or less. It is preferred that $B_2O_3$ is not substantially contained. The term "is not substantially contained" in the present invention means that the component is not contained except for unavoidable impurities. The unavoidable impurities in the matrix composition of the present invention are, for example, preferably 0.08% or less, more preferably 0.05% or less, and still more preferably 0.03% or less.

It is particularly preferred to contain $SiO_2$: 65 to 75%, $Al_2O_3$: 0 to 5%, MgO: 0 to 6%, CaO: 5 to 12%, $Na_2O$: 10 to 16%, $K_2O$: 0 to 3%, MgO+CaO: 5 to 15%, and $Na_2O$+$K_2O$: 10 to 16%.

When the use of the wavelength-selective transmissive glass of the present invention is a front plate of FPD, it is preferred to contain as a glass matrix composition $SiO_2$: 45 to 80%, $Al_2O_3$: more than 7% and 30% or less, $B_2O_3$: 0 to 15%, MgO: 0 to 15%, CaO: 0 to 6%, $Na_2O$: 7 to 20%, $K_2O$: 0 to 10% and $ZrO_2$: 0 to 10%, as represented by mass % based on oxides.

When the use of the wavelength-selective transmissive glass of the present invention is a cover glass provided on the front of FPD, it is preferred to contain as a glass matrix composition $SiO_2$: 45 to 70%, $Al_2O_3$: 10 to 30%, $B_2O_3$: 0 to 15%, at least one selected from the group consisting of MgO, CaO, SrO and BaO: 5 to 30%, and at least one selected from the group consisting of $Li_2O$, $Na_2O$ and $K_2O$: 0% or more and 7% or less, as represented by mass % based on oxides.

When manufacturing the wavelength-selective transmissive glass of the present invention, a desired forming method depending on its use can be used. Examples of the forming method include a float process, a rollout process, and a fusion process.

The wavelength-selective transmissive glass of the present invention may be a glass having been subjected to a strengthening treatment, such as a chemically strengthened glass or a physically strengthened glass, and may be a wire glass.

As described above, the light transmittances ($T_{more\ than\ 315\ nm\ and\ 400\ nm\ or\ less}$, $T_{360\ to\ 400\ nm}$ and $T_{315\ nm\ or\ less}$) and the visible light transmittance ($T_{400\ to\ 760\ nm}$) are evaluated as transmittance in terms of a plate thickness of 6 mm in the present description. However, the plate thickness of the wavelength-selective transmissive glass of the present invention is not limited to this, and can appropriately select the plate thickness depending on its use.

When the use of the wavelength-selective transmissive glass of the present invention is window glasses for building materials, the plate thickness thereof is generally 6 mm. The plate thickness is generally 20 mm or less, 15 mm or less, 10 mm or less and 8 mm or less, and is generally 2 mm or more, 3 mm or more and 4 mm or more. In the case of window glasses for automobiles, the plate thickness thereof is 1 to 5 mm.

On the other hand, when the use of the wavelength-selective transmissive glass of the present invention is a front plate of FPD, the plate thickness thereof is generally 0.05 to 0.7 mm.

When the use of the wavelength-selective transmissive glass of the present invention is a cover glass provided on the front of FPD, the plate thickness thereof is generally 0.01 to 4 mm.

As described above, the general plate thickness of the front plate of FPD greatly differs from the standard plate thickness (6 mm) when evaluating the light transmittances ($T_{more\ than\ 315\ nm\ and\ 400\ nm\ or\ less}$, $T_{360\ to\ 400\ nm}$ and $T_{315\ nm\ or\ less}$) and the visible light transmittance ($T_{400\ to\ 760\ nm}$). In such a case, it is preferred that the light transmittances ($T_{more\ than\ 315\ nm\ and\ 400\ nm\ or\ less}$, $T_{360\ to\ 400\ nm}$ and $T_{315\ nm\ or\ less}$) and the visible light transmittance ($T_{400\ to\ 760\ nm}$) in the actual plate thickness satisfy the above ranges.

EXAMPLES

The present invention is further described below by reference to Examples.

Glass raw materials generally used, such as oxides, were appropriately selected so as to be glass compositions shown in Tables below. The respective resulting mixtures were placed on a platinum crucible. The crucible was placed in a resistance heating type electric furnace of 1,600° C., and the mixture was melted for 3 hours, followed by defoaming and homogenizing. The resulting melt was poured into a mold material, maintained at a temperature about 30° C. higher than the glass transition temperature for 1 hour or more, and cooled slowly to room temperature in a cooling rate of 0.3 to 1° C./min. Thus, plate-like glass samples (plate thickness 6 mm) of Examples 1 to 29 were manufactured. Examples 1 to 29 are Invention Examples.

Fe-Redox of the glass samples obtained was calculated from a spectrum curve of the glass samples measured by a spectrophotometer using the following formula (1).

$$\text{Fe-Redox (\%)} = -\log_e(T_{1000\,nm}/91.4)/(Fe_2O_3 \text{ amount} \times t \times 20.79) \times 100 \quad (1)$$

In the above formula, $T_{1000\,nm}$ is the transmittance (%) at a wavelength of 1,000 nm measured by a spectrophotometer (Lambda 950, manufactured by Perkin Elmer), t is a thickness (cm) of a glass sample, and $Fe_2O_3$ amount is the total iron content (%=mass percentage) in terms of $Fe_2O_3$ obtained by X-ray fluorescent measurement.

Furthermore, the light transmittance ($T_{more\ than\ 315\ nm\ and\ 400\ nm\ or\ less}$) at a wavelength of more than 315 nm and 400 nm or less, the light transmittance $T_{360\ to\ 400\ nm}$ at a wavelength of 360 to 400 nm, the light transmittance $T_{315\ nm\ or\ less}$ at a wavelength of 315 mm or less, the visible light transmittance $T_{400\ to\ 760\ nm}$ at a wavelength of 400 to 760 nm and the domain wavelength Dw were measured using a spectrophotometer (Lambda 950, manufactured by Perkin Elmer).

TABLE 1

| wt % | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| $SiO_2$ | 71.9 | 71.6 | 70.7 | 72.7 | 71.8 | 72.6 | 72.6 | 72.5 | 71.8 |
| $Al_2O_3$ | 0.5 | 0.5 | 0.5 | 0.5 | 0.5 | 0.5 | 0.5 | 0.5 | 0.5 |
| $B_2O_3$ | | | | | | | | | |
| MgO | 4.2 | 4.2 | 4.2 | 4.2 | 4.2 | 4.2 | 4.2 | 4.2 | 4.2 |
| CaO | 8.9 | 8.9 | 8.9 | 8.9 | 8.9 | 8.9 | 8.9 | 8.9 | 8.9 |
| SrO | | | | | | | | | |
| BaO | | | | | | | | | |
| $ZrO_2$ | | | | | | | | | |
| $Li_2O$ | | | | | | | | | |
| $Na_2O$ | 13.4 | 13.4 | 13.4 | 13.4 | 13.4 | 13.4 | 13.4 | 13.4 | 13.4 |
| $K_2O$ | 0.1 | 0.1 | 0.1 | 0.1 | 0.1 | 0.1 | 0.1 | 0.1 | 0.1 |
| $Fe_2O_3$ | 0.1 | 1.0 | 1.0 | 0.01 | 0.10 | 0.10 | 0.10 | 0.10 | 0.1 |
| $CeO_2$ | 1.0 | 0.2 | 1.0 | 0.1 | 1.0 | | | 0.1 | 1.0 |
| $TiO_2$ | | 0.2 | 0.2 | | | | | | |
| $Cr_2O_3$ | | | | | | | | | 0.1 |
| $SnO_2$ | | | | | | 0.1 | 0.1 | 0.1 | |
| $SO_3$ | 0.015 | 0.020 | 0.07 | 0.150 | 0.070 | 0.150 | 0.200 | 0.150 | 0.015 |
| CoO | | | | 0.05 | 0.0015 | | | 0.0008 | |
| Se | | | 0.0025 | | 0.0005 | | | 0.0001 | |
| NiO | | | | | 0.0001 | | | | |
| $MnO_2$ | 0.02 | | | | | | | | |
| $CeO_2/(CeO_2 + TiO_2 + Fe_2O_3)$ | 0.91 | 0.14 | 0.45 | 0.91 | 0.91 | 0.00 | 0.00 | 0.50 | 0.91 |
| $CeO_2 + 3TiO_2 + 6SnO_2$ | 1 | 0.8 | 1.6 | 0.1 | 1 | 0.6 | 0.6 | 0.7 | 1 |
| Fe-Redox (%) | 60.0 | 50.0 | 40.0 | 30.0 | 50.0 | 30.0 | 10.0 | 30.0 | 60.0 |
| $T_{more\ than\ 315\ nm\ and\ 400\ nm\ or\ less}$ (%) | 51.8 | 29.7 | 10.4 | 72.2 | 41.8 | 62.5 | 60.5 | 57.8 | 59.9 |
| $T_{360\ to\ 400\ nm}$ (%) | 75.4 | 42.5 | 14.9 | 81.8 | 60.8 | 82.4 | 80.4 | 77.0 | 76.8 |
| $T_{315\ nm\ or\ less}$ (%) | 0.0 | 0.0 | 0.0 | 56.1 | 0.0 | 0.3 | 0.1 | 0.1 | 2.1 |
| $T_{400\ to\ 760\ nm}$ (%) | 85.4 | 52.4 | 27.0 | 9.4 | 68.5 | 87.9 | 89.1 | 82.9 | 59.1 |
| Dw (nm) | 488 | 490 | 572 | 466 | 522 | 493 | 555 | 521 | 560 |

TABLE 2

| wt % | Ex. 10 | Ex 11 | Ex. 12 | Ex. 13 | Ex. 14 | Ex. 15 | Ex. 16 | Ex. 17 | Ex. 18 |
|---|---|---|---|---|---|---|---|---|---|
| $SiO_2$ | 69.3 | 69.2 | 69.1 | 69.2 | 69.3 | 59.2 | 56.8 | 60.7 | 61.5 |
| $Al_2O_3$ | 3.5 | 3.5 | 3.5 | 3.5 | 3.5 | 16.9 | 7.0 | 12.9 | 18.4 |
| $B_2O_3$ | | | | | | 8.4 | | | |
| MgO | 0.3 | 0.3 | 0.3 | 0.3 | 0.3 | 3.0 | | 6.7 | |
| CaO | 9.6 | 9.6 | 9.6 | 9.6 | 9.6 | 4.2 | 7.0 | | |
| SrO | | | | | | 7.8 | 2.0 | | |
| BaO | | | | | | | 4.0 | | |
| $ZrO_2$ | | | | | | | 9.0 | 1.0 | 3.5 |
| $Li_2O$ | | | | | | | 6.0 | | 5.8 |
| $Na_2O$ | 14.6 | 14.6 | 14.6 | 14.6 | 14.6 | | 4.0 | 12.3 | 5.4 |
| $K_2O$ | 1.5 | 1.5 | 1.5 | 1.5 | 1.5 | | 3.0 | 6.0 | 5.0 |
| $Fe_2O_3$ | 0.1 | 0.1 | 0.1 | 0.1 | 1 | 0.5 | 1 | 0.5 | 0.3 |
| $CeO_2$ | 1.0 | 1.0 | 1.0 | 1.0 | 0.1 | | | | |
| $TiO_2$ | | | 0.1 | 0.1 | 0.1 | | | | |
| $Cr_2O_3$ | | | | | | | | | |
| $SnO_2$ | | 0.1 | 0.1 | 0.1 | | | | | |
| $SO_3$ | 0.015 | 0.015 | 0.015 | 0.015 | 0.015 | 0.005 | 0.18 | 0.05 | 0.12 |
| CoO | | | | 0.001 | | | | | |
| Se | | | | 0.0005 | | | | | |
| NiO | | | | | | | | | |
| $MnO_2$ | | | | | | 0.01 | | | |

TABLE 2-continued

| wt % | Ex. 10 | Ex 11 | Ex. 12 | Ex. 13 | Ex. 14 | Ex. 15 | Ex. 16 | Ex. 17 | Ex. 18 |
|---|---|---|---|---|---|---|---|---|---|
| $CeO_2/(CeO_2 + TiO_2 + Fe_2O_3)$ | 0.91 | 0.91 | 0.83 | 0.83 | 0.08 | 0.00 | 0.00 | 0.00 | 0.00 |
| $CeO_2 + 3TiO_2 + 6SnO_2$ | 1 | 1.6 | 1.9 | 1.9 | 0.4 | 0 | 0 | 0 | 0 |
| Fe-Redox (%) | 60 | 60 | 50 | 50 | 30 | 70 | 40 | 45 | 40 |
| $T_{more\ than\ 315\ nm\ and\ 400\ nm\ or\ less}$ (%) | 63.7 | 62.0 | 62.3 | 53.2 | 24.0 | 63.3 | 32.1 | 49.3 | 58.6 |
| $T_{360\ to\ 400\ nm}$ (%) | 84.9 | 84.9 | 83.2 | 71.9 | 34.4 | 79.1 | 45.1 | 65.9 | 74.7 |
| $T_{315\ nm\ or\ less}$ (%) | 0.0 | 0.0 | 0.0 | 0.0 | 0.0 | 0.0 | 00 | 0.0 | 0.0 |
| $T_{400\ to\ 760\ nm}$ (%) | 86.4 | 86.4 | 86.9 | 73.0 | 54.7 | 67.3 | 60.3 | 72.5 | 79.8 |
| Dw (nm) | 488 | 488 | 490 | 580 | 527 | 486 | 490 | 489 | 489 |

TABLE 3

| wt % | Ex. 19 | Ex. 20 | Ex. 21 | Ex. 22 | Ex. 23 | Ex. 24 | Ex. 25 | Ex. 26 | Ex. 27 | Ex. 28 | Ex. 29 |
|---|---|---|---|---|---|---|---|---|---|---|---|
| $SiO_2$ | 69.94 | 69.94 | 69.94 | 69.94 | 69.94 | 69.94 | 69.94 | 69.94 | 69.94 | 69.94 | 69.94 |
| $Al_2O_3$ | 1.56 | 1.56 | 1.56 | 1.56 | 1.56 | 1.56 | 1.56 | 1.56 | 1.56 | 1.56 | 1.56 |
| $B_2O_3$ | | | | | | | | | | | |
| MgO | 4.45 | 4.45 | 4.45 | 4.45 | 4.45 | 4.45 | 4.45 | 4.45 | 4.45 | 4.45 | 4.45 |
| CaO | 7.91 | 7.91 | 7.91 | 7.91 | 7.91 | 7.91 | 7.91 | 7.91 | 7.91 | 7.91 | 7.91 |
| SrO | | | | | | | | | | | |
| BaO | | | | | | | | | | | |
| $ZrO_2$ | | | | | | | | | | | |
| $Li_2O$ | | | | | | | | | | | |
| $Na_2O$ | 13.24 | 13.24 | 13.24 | 13.24 | 13.24 | 13.24 | 13.24 | 13.24 | 13.24 | 13.24 | 13.24 |
| $K_2O$ | 0.75 | 0.75 | 0.75 | 0.75 | 0.75 | 0.75 | 0.75 | 0.75 | 0.75 | 0.75 | 0.75 |
| $Fe_2O_3$ | 0.04 | 0.15 | 0.10 | 0.10 | 0.08 | 0.06 | 0.04 | 0.37 | 0.20 | 0.08 | 0.09 |
| $CeO_2$ | 0.55 | 0.30 | 0.35 | 0.40 | 0.50 | 0.28 | 0.45 | 0.27 | 0.35 | 0.36 | 0.42 |
| $TiO_2$ | 0.01 | 0.02 | 0.20 | 0.01 | 0.10 | 0.07 | 0.01 | 0.04 | 0.25 | 0.02 | 0.01 |
| $Cr_2O_3$ | | | | | | | | | | | |
| $SnO_2$ | | | | | | | | | | | |
| $SO_3$ | | | | | | | | | | | |
| CoO | | | | | | | | | | | |
| Se | | | | | | | | | | | |
| NiO | | | | | | | | | | | |
| $MnO_2$ | | | | | | | | | | | |
| $CeO_2/(CeO_2 + TiO_2 + Fe_2O_3)$ | 0.92 | 0.64 | 0.54 | 0.78 | 0.74 | 0.68 | 0.90 | 0.40 | 0.44 | 0.78 | 0.81 |
| $CeO_2 + 3TiO_2 + 6SnO_2$ | 0.58 | 0.36 | 0.95 | 0.43 | 0.8 | 0.49 | 0.48 | 0.39 | 1.1 | 0.42 | 0.45 |
| Fe-Redox (%) | 30 | 60 | 55 | 32 | 45 | 40 | 28 | 58 | 48 | 36 | 38 |
| $T_{more\ than\ 315\ nm\ and\ 400\ nm\ or\ less}$ (%) | 32.5 | 36.7 | 33.8 | 33.4 | 31.5 | 38.2 | 34.4 | 31.9 | 30.0 | 34.4 | 33.8 |
| $T_{360\ to\ 400\ nm}$ (%) | 66.8 | 71.4 | 67.0 | 67.1 | 64.5 | 73.5 | 69.6 | 62.5 | 60.2 | 68.5 | 68.1 |
| $T_{315\ nm\ or\ less}$ (%) | 0.0 | 0.0 | 0.0 | 0.0 | 0.0 | 0.2 | 0.0 | 0.0 | 0.0 | 0.0 | 0.0 |
| $T_{400\ to\ 760\ nm}$ (%) | 89.7 | 83.6 | 86.1 | 87.5 | 87.5 | 88.8 | 89.8 | 74.1 | 81.9 | 87.9 | 88.2 |
| Dw (nm) | 492 | 488 | 489 | 493 | 490 | 504 | 493 | 487 | 490 | 498 | 494 |

The glasses of the Examples were all that the light transmittance $T_{more\ than\ 315\ nm\ and\ 400\ nm\ or\ less}$ at a wavelength of more than 315 nm and 400 nm or less was 1% or more, the light transmittance $T_{360\ to\ 400\ nm}$ at a wavelength of 360 to 400 nm was 1% or more, the light transmittance $T_{315\ nm\ or\ less}$ at a wavelength of 315 mm or less was 60% or less, and the visible light transmittance $T_{400-760\ nm}$ at a wavelength of 400 to 760 nm was 1% or more. Furthermore, the domain wavelength Dw measured using light source A was 380 to 700 nm.

While the present invention has been described in detail and with reference to specific embodiments thereof, it will be apparent to one skilled in the art that various changes and modifications can be made therein without departing from the spirit and scope thereof.

This application is based on Japanese Patent Application No. 2015-235799 filed on Dec. 2, 2015, the entire subject matter of which is incorporated herein by reference.

The invention claimed is:

1. A wavelength-selective transmissive glass, comprising, as represented by mass % based on oxides,
a total iron content represented by $Fe_2O_3$ of from 0.04 to 0.15%, from 0.35 to 0.45% of $CeO_2$, from 0 to 0.2% of $TiO_2$, and from 0 to 0.2% of $SnO_2$, wherein $CeO_2+3\times TiO_2+6\times SnO_2$ is from 0.41 to 0.5, and a value of Fe-Redox is from 25 to 65%,
wherein a glass matrix composition comprises from 60 to 80%, of $SiO_2$, from 0 to 7%, of $Al_2O_3$, from 0 to 10% of MgO, from 4 to 20% of CaO, from 7 to 20% of $Na_2O$, from 0 to 10% of $K_2O$, and 0.5% or less of $B_2O_3$,
having a light transmittance $T_{more\ than\ 315\ nm\ and\ 400\ nm\ or\ less}$ at a wavelength of from more than 315 nm to 400 nm represented by the following formula of 1% or more in terms of a plate thickness of 6 mm and a light transmittance $T_{315\ nm\ or\ less}$ at a wavelength of 315 nm or less represented by the following formula of 60% or less in terms of a plate thickness of 6 mm:

$$T_{more\ than\ 315\ nm\ and\ 400\ nm\ or\ less} = (\Sigma_{k=more\ than\ 315}^{400} A_k \times T_k)/(\Sigma_{k=more\ than\ 315}^{400} A_k)$$

$$T_{315\ nm\ or\ less} = (\Sigma_{k=300}^{315} A_k \times T_k)/(\Sigma_{k=300}^{315} A_k),$$

wherein $A_k$ is a weighting factor at a wavelength k in nm for calculating T which is light transmittance defined in ISO-9050:2003, and $T_k$ is a transmittance at the wavelength k in nm in terms of a plate thickness of 6 mm, and having a dominant wavelength Dw measured using light source A of 460 to 510 nm in terms of a plate thickness of 6 mm.

2. The wavelength-selective transmissive glass according to claim 1, comprising, as represented by mass % based on oxides:

from 65 to 75% of $SiO_2$, from 0 to 5% of $Al_2O_3$, from 0 to 6% of MgO, from 5 to 12% of CaO, from 10 to 16% of $Na_2O$, from 0 to 3% of $K_2O$ as a glass matrix composition, and wherein [MgOH+CaO] is from 5 to 15% and [$Na_2O$+$K_2O$] is from 10 to 16%.

3. The wavelength-selective transmissive glass according to claim 1, wherein [MgO+CaO] is from 5 to 15%.

4. The wavelength-selective transmissive glass according to claim 1, wherein [$Na_2O$+$K_2O$] is from 10 to 16%.

5. The wavelength-selective transmissive glass according to claim 1, having the $T_{more\ than\ 315\ nm\ and\ 400\ nm\ or\ less}$ of from 18 to 70% in terms of a plate thickness of 6 mm and $T_{315\ nm\ or\ less}$ of 1% or less in terms of a plate thickness of 6 mm.

6. The wavelength-selective transmissive glass according to claim 5, having the $T_{more\ than\ 315\ nm\ and\ 400\ nm\ or\ less}$ of from 50 to 68% in terms of a plate thickness of 6 mm and $T_{315\ nm\ or\ less}$ of 0.1% or less in terms of a plate thickness of 6 mm.

7. The wavelength-selective transmissive glass according to claim 1, having a light transmittance $T_{360\ to\ 400\ nm}$ at a wavelength of from 360 to 400 nm represented by the following formula of 1% or more in terms of a plate thickness of 6 mm:

$$T_{360-400\ nm} = (\Sigma_{k=360}^{400} A_k \times T_k)/(\Sigma_{k=360}^{400} A_k),$$

wherein $A_k$ is a weighting factor at a wavelength k in nm for calculating light transmittance T defined in ISO-9050:2003, and $T_k$ is a transmittance at the wavelength k in nm in terms of a plate thickness of 6 mm.

8. The wavelength-selective transmissive glass according to claim 7, having the $T_{360\ to\ 400\ nm}$ of from 19 to 92% in terms of a plate thickness of 6 mm.

9. The wavelength-selective transmissive glass according to claim 8, having the $T_{360\ to\ 400\ nm}$ of from 70 to 90% in terms of a plate thickness of 6 mm.

10. The wavelength-selective transmissive glass according to claim 1, having a light transmittance $T_{400\ to\ 760\ nm}$ at a wavelength of from 400 to 760 nm represented by the following formula of 1% or more in terms of a plate thickness of 6 mm:

$$T_{400-760\ nm} = (\Sigma_{k=400}^{760} A'_k \times T_k)/(\Sigma_{k=400}^{760} A'_k),$$

wherein $A'_k$ is a weighting factor at a wavelength k in nm for calculating visible light transmittance using light source D65, T_D65 defined in ISO-9050:2003, and $T_k$ is a transmittance at the wavelength k in nm in terms of a plate thickness of 6 mm.

11. The wavelength-selective transmissive glass according to claim 10, having the $T_{400\ to\ 760\ nm}$ of from 40 to 92% in terms of a plate thickness of 6 mm.

12. The wavelength-selective transmissive glass according to claim 11, having the $T_{400\ to\ 760\ nm}$ of from 80 to 92% in terms of a plate thickness of 6 mm.

* * * * *